(12) United States Patent
Bhowmik

(10) Patent No.: US 7,277,617 B2
(45) Date of Patent: Oct. 2, 2007

(54) OPTICAL PULSE COMPRESSOR BASED ON INTEGRATED PLANAR LIGHTWAVE CIRCUIT: METHOD, DEVICE, AND SYSTEMS

(75) Inventor: Achintya K. Bhowmik, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 513 days.

(21) Appl. No.: 10/430,919

(22) Filed: May 7, 2003

(65) Prior Publication Data

US 2004/0223710 A1   Nov. 11, 2004

(51) Int. Cl.
*G02B 6/00* (2006.01)
(52) U.S. Cl. ..................................... 385/122
(58) Field of Classification Search ................. 385/122
See application file for complete search history.

(56) References Cited

U.S. PATENT DOCUMENTS

| | | | |
|---|---|---|---|
| 4,588,957 A | | 5/1986 | Balant et al. |
| 5,502,781 A | * | 3/1996 | Li et al. ........................ 385/4 |
| 5,881,199 A | * | 3/1999 | Li .............................. 385/140 |
| 5,923,683 A | * | 7/1999 | Morioka et al. ................ 372/6 |
| 5,963,567 A | * | 10/1999 | Veselka et al. ............... 372/21 |
| 5,963,683 A | * | 10/1999 | Goorjian ...................... 385/16 |
| 6,108,474 A | * | 8/2000 | Eggleton et al. ............ 385/122 |
| 6,201,916 B1 | * | 3/2001 | Eggleton et al. ............ 385/122 |
| 6,208,792 B1 | * | 3/2001 | Hwang et al. ............... 385/129 |
| 6,212,315 B1 | * | 4/2001 | Doerr ........................... 385/31 |
| 6,724,783 B2 | * | 4/2004 | Jalali et al. .................... 372/9 |
| 6,788,862 B2 | * | 9/2004 | Aitken et al. ................ 385/122 |
| 6,892,021 B2 | * | 5/2005 | Doerr ......................... 385/140 |
| 2002/0071627 A1 | * | 6/2002 | Smith et al. .................. 385/15 |
| 2003/0031412 A1 | * | 2/2003 | Payne et al. .................. 385/37 |
| 2004/0081393 A1 | * | 4/2004 | Singh et al. .................. 385/27 |
| 2004/0190823 A1 | * | 9/2004 | Leuthold et al. ............. 385/27 |
| 2004/0228564 A1 | * | 11/2004 | Gunn et al. .................... 385/1 |

OTHER PUBLICATIONS

C.R. Doerr. Wavelength-division multiplexing cross connect in InP. IEEE Photonics Technology Letters, vol. 10 No. 1, pp. 117-119, Jan. 1998.*
K. Kitayama et al. Optical pulse compression by nonlinear coupling. Applied Physics Letters 43(1), pp. 17-19, Jul. 1983.*
A. Feldner et al., *Linear Optical Properties of Polydiacetylene Para-Toluene Sulfonate Thin Films*, Optics Communications, North-Holland Publishing Co., Amsterdam, NL vol. 195, No. 1-4, Aug. 2001, pp. 205-209.
K. Okamoto et al., *Fabrication of Frequency Spectrum Synthesiser Consisting of Arrayed-Waveguide Grating Pair and Thermo-Optic Amplitude and Phase Controllers*, Electronic Letters, IEE Stevenage, GB, vol. 35, No. 9, Apr. 29, 1999, pp. 733-734.

(Continued)

*Primary Examiner*—Rodney Bovernick
*Assistant Examiner*—M. Stahl
(74) *Attorney, Agent, or Firm*—Trop, Pruner & Hu, P.C.

(57) ABSTRACT

A nonlinear optical waveguide may be utilized, together with arrayed waveguide grating demultiplexer/multiplexer and thermo-optic phase shifters, to achieve pulse compression of optical pulses. In some embodiments, a relatively compact pulse compressor can be achieved based on integrated planar lightwave circuit.

9 Claims, 2 Drawing Sheets

OTHER PUBLICATIONS

D. Leaird et al., *Femtosecond Pulse Sequence Processing Using a Double-Passed Arrayed Waveguide Grating*, Conference on Lasers and Electro-Optics, (CLEO 2002), Technical Digest. Postconference Edition, Long Beach, CA, May 19-24, 2002, Trends in Optics and Photonics (TOPS), Washington, WA : OSA, US, vol. 73, May 19, 2002, pp. 114-115.

Y. Lee, *Dispersion-Compensation Device with Waveguide Grating Routers*, Optical Review, Springer Verlag, Tokyo, JP, vol. 5, No. 4, Jul. 1, 1998, pp. 226-233.

H. Tsuda et al., *Performance Analysis of a Dispersion Compensator Using Arrayed-Waveguide Gratings*, Journal of Lightwave Technology, IEEE USA, vol. 18, No. 8, pp. 1139-1147, Aug. 2000.

A. Bhowmik et al., *Self-Phase Modulation in Polydiacetylene Single Crystal Measured at 720-1064 nm*, Optics Letters, Optical Society of America, Washington, US, vol. 26, No. 12, Jun. 15, 2001, pp. 902-904.

A. Bhowmik et al., *Studies of SPM-Induced Spectral Broadening in PTS-Polydiacetylene*, NonLinear Optics '98 Material, Fundamentals and Applications Topical Meeting (Cat. No. 98CH36244), IEEE New York, NY, USA, Aug. 1998, pp. 194-196.

B. Eggleton et al., *Bragg Grating Solitons*, Physical Review Letters, vol. 76, No. 10, Mar. 4, 1996, pp. 1627-1630.

* cited by examiner

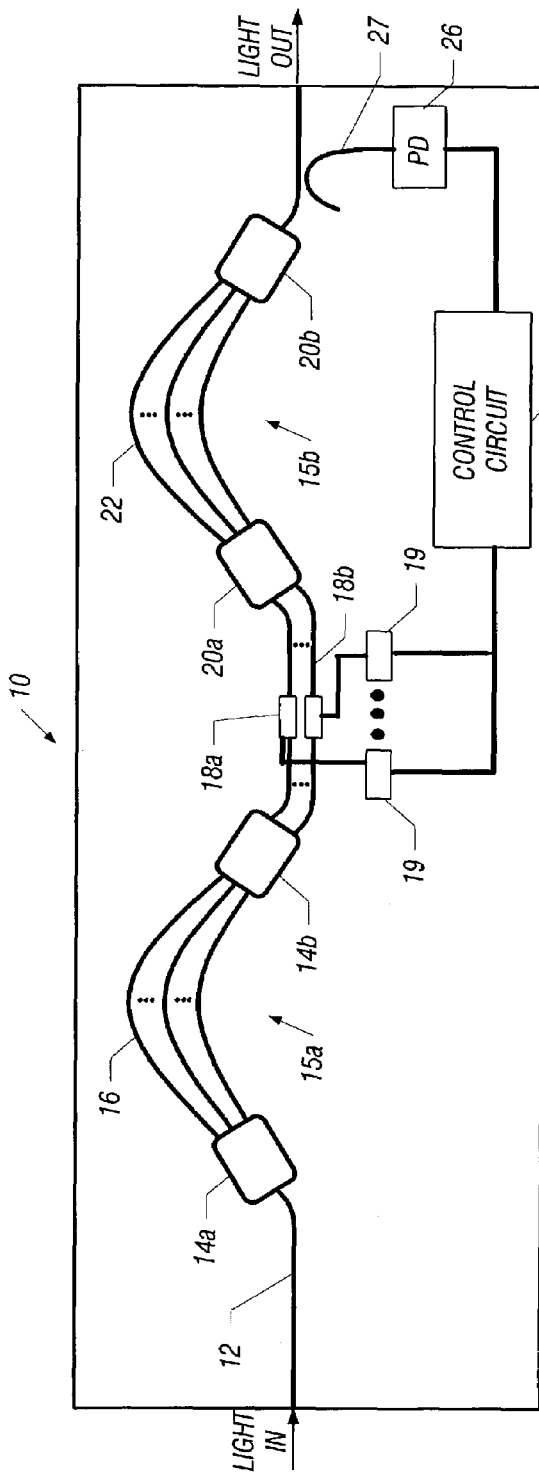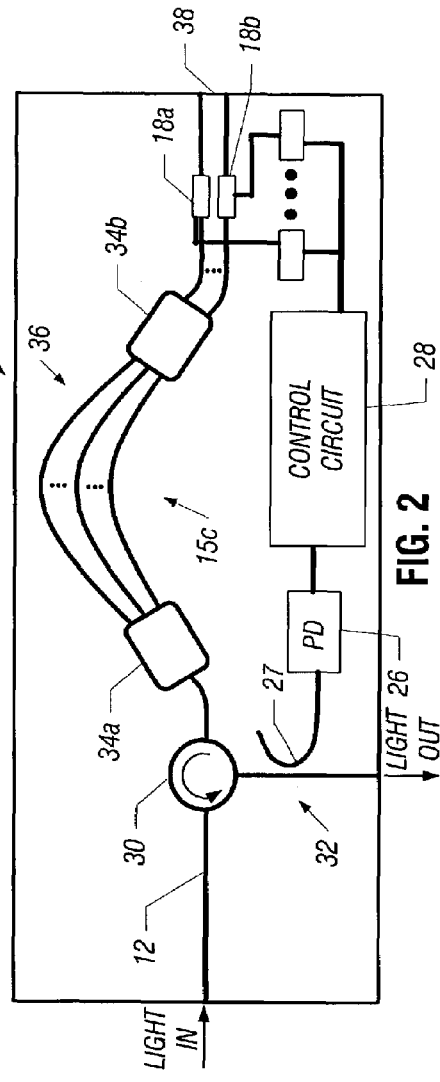
FIG. 1
FIG. 2

OPTICAL PULSE COMPRESSOR BASED ON INTEGRATED PLANAR LIGHTWAVE CIRCUIT: METHOD, DEVICE, AND SYSTEMS

BACKGROUND

This invention relates generally to optical communication systems and more specifically to compressing optical pulses.

In optical communication networks, the optical pulses stretch in time due to the dispersion in the optical fiber that results in distortions of the encoded information. Dispersion of a material describes the dependence of refractive index of the medium on the wavelength of the light traveling through the medium. In the case of light traveling through a waveguide, dispersion results from the dependence of the propagation constant on the wavelength of the signal and consists of material as well as geometric dispersion components. The temporal spread of the pulses due to dispersion causes successive pulses to overlap in time domain with each other, thus resulting in bit errors in the communication systems. This limits the optical fiber link length between the transmitter and the receiver ends in the network as well as the bit-rate of the communication system.

In response to pulse spreading, pulse compressors may be utilized, but these devices tend to be large table-top size devices that include long nonlinear optical fibers followed by pairs of free space diffraction gratings.

Compact and cost-effective optical pulse compressors will benefit applications in other areas as well. For example, short optical pulses are increasingly being used in medical applications such as laser surgery, industrial applications such as precise laser machining, research and development involving laser-matter interactions, defense applications, etc.

Thus, there is a need for a more reasonably sized optical pulse compressor for use in optical communication networks.

BRIEF DESCRIPTION OF THE DRAWINGS

FIG. 1 is a schematic depiction of one embodiment of the present invention;

FIG. 2 is a schematic depiction of another embodiment of the present invention.

DETAILED DESCRIPTION

Figure 3:
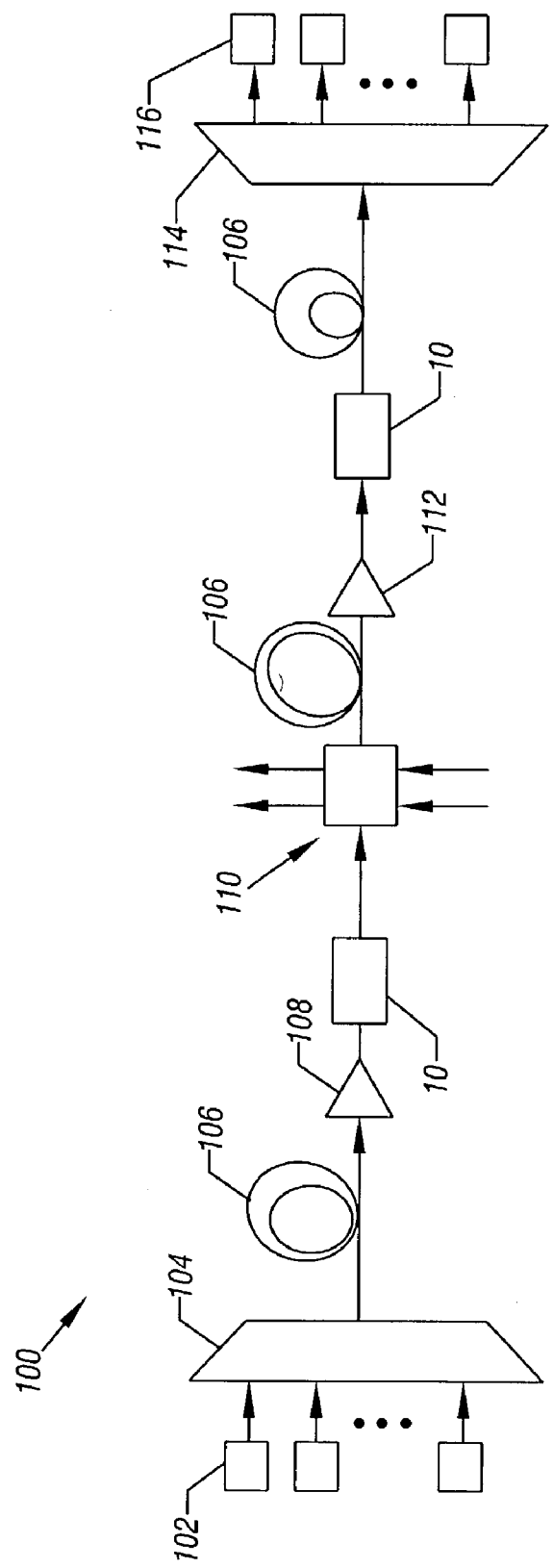
FIG. 3 is a schematic system depiction in accordance with one embodiment of the present invention.

Referring to FIG. 1, the planar lightwave circuit 10 may be formed on an integrated optical circuit substrate such as silicon using semiconductor fabrication techniques. An input optical pulse ("light in") passes through a waveguide 12 formed on the planar lightwave circuit 10.

The waveguide 12 may be composed of a third order non-linear optical material in some embodiments. The material may also have a large hyperpolarizability. One suitable material is polydiacetylene-para-toluene-sulfonate (PDA-PTS). Other embodiments may utilize other polymers, such as polydiacetylene 4-butylcarboxymethylurethane (PDA-BCMU), polyphenylenevinylene (PPV), polypyrrole, polythiophene, polycarbonate, etc. Yet other embodiments may use inorganic substances such as silica waveguides doped with nonlinear materials, III-V semiconductor systems such as Gallium Arsenide (GaAs), Indium Phosphide (InP), etc. The waveguide 12 may have a high non-linear refractive index due to a one-dimensional confinement of the delocalized π-electrons in the polymer chain in one embodiment. The nonlinear refractive index of the waveguide 12 may be higher than $10^{-8}$ cm$^2$/megaWatt in some embodiments.

Growth of large area high quality films of similar organic systems on planar substrates has been demonstrated. See A. Bhowmik et al., *J. Appl. Phys.*, vol. 86, pp. 923 (1999). A one centimeter long waveguide of PDA-PTS imparts a similar amount of self-phase modulation as a one kilometer long conventional single-mode fiber.

The instantaneous phase-shift due to the optical non-linearity of the waveguide 12 spectrally broadens the input pulse by creating new frequency components. The waveguide 12 also generates a frequency chirp in the pulse through self-phase modulation. In self-phase modulation, the modulation is the frequency change caused by a phase-shift induced by the pulse itself.

The resulting pulse is then spectrally sliced using an arrayed waveguide grating demultiplexer 15a, which includes a star coupler 14a coupled to an array of waveguides 16 and another star coupler 14b on the output end. The different wavelength components of the pulse are thus spatially separated to generate a plurality of pulses by the demultiplexer. The output pulses from the demultiplexer 15a propagates through a series of phase shifters 18 on each waveguide 16. The phase shifters 18 produce the required relative delays between the different spectral components to compensate for the chirp in the pulse. Each phase shifter 18 may be an electrical resistance heater coupled to a source of current through a pad 19 in one embodiment. The heating supplied by each shifter 18 shifts the phase of the optical signal passing through the waveguide 16 through the thermo-optic effect. Alternately, in other embodiments, the phase shift may be imparted through other mechanisms such as electro-optic or piezo-optic effects using suitable materials.

Finally, the pulses are recombined using a multiplexer 15b in the form of an arrayed waveguide grating 27, having star couplers 20a and 20b and arrayed waveguides 22. A small amount of the multiplexed light, tapped using a directional coupler may be sent to a detector 26 for monitoring the peak power.

The electrical signal from the detector 26 may be fed back to the phase shifters 18 via a signal processing circuit 28 to maximize the peak power of the outgoing pulse by optimizing the chirp compensation. The circuit 10 may include optical and electrical components both formed using integrated circuit fabrication techniques in some embodiments. In other embodiments, the electrical signal processing circuit may be external to the optical circuit. In one embodiment, the maximization of the peak power of the outgoing pulse may involve the minimization of its pulse width.

Referring to FIG. 2, instead of using a pair of demultiplexer and multiplexer, a single arrayed waveguide grating device 15c may be utilized in the planar lightwave circuit 10a, together with the circulator 30, to both multiplex and demultiplex. A tap 32 provides a light output which may be monitored with a detector 26. A reflecting facet 38 reflects the light back through the arrayed waveguides 36 and the couplers 34a and 34b. In some embodiments, the reflecting facets may be formed by depositing metallic thin films such as Al, Au, TiW, etc., on the facet. In other embodiments, the reflection may be achieved by grating structures written with UV-light exposure of photosensitive waveguides or defined photolithographically. In yet other embodiments, the reflection may be imparted by multi-layer dielectric thin films with alternating high and low refractive indices.

One limitation of currently available pulse compressors based on free-space diffraction gratings is that they are unable to compress negatively chirped input optical pulses, thereby requiring preconditioning of the pulses. This is because the grating pairs provide anomalous dispersion by slowing down the long wavelength components of the pulse compared to the short wavelength components. Some embodiments of the present invention may be effective regardless of chirp characteristics of the input light pulse since the spectral slicing followed by the tunable phase shifters can provide optimized relative delay to the different spectral components. Thus, optical pulses with arbitrary temporal and spectral profiles may be compressed using some embodiments of the present invention.

In some embodiments, both positively and negatively chirped pulses may be utilized. The system may be tunable in the time domain and the chirp profile of the input optical pulse can be optimized for maximum compression, in some embodiments. A relatively small footprint may be achieved in some cases as well.

Referring to FIG. 3, an optical communication network 100 may include a plurality of transmitters 102, which feed a multiplexer 104. The multiplexer 104 may be coupled to a fiber link 106, in turn coupled to an optical amplifier 108. The optical amplifier 108 may be coupled to a planar light wave circuit 10 already described. The circuit 10 may in turn be coupled to an optical cross connect 110, another fiber link 106, another optical amplifier 112, and another circuit 10, already described. The second circuit 10 may be coupled to a fiber link 106, in turn coupled to a demultiplexer 114. The demultiplexer 114 may provide signals to a plurality of receivers 116 coupled thereto.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

exposing an optical pulse to a non-linear waveguide having a nonlinear refractive index of at least $10^{-8}$ cm$^2$/megaWatt;

compressing the optical pulse;

demultiplexing the optical pulse into separate wavelengths;

using an arrayed waveguide grating to demultiplex said optical pulse; and phase-shifting at least two of said wavelengths by different amounts to compensate for chirp in the pulse.

2. The method of claim 1 including forming a non-linear waveguide of at least one component selected from the group including polydiacetylene-para-toluene-sulfonate, polydiacetylene 4-butylcarboxymethylurethane, polyphenylenevinylene, polypyrrole, polythiophene, polycarbonate silica doped with nonlinear materials, III-V semiconductor systems.

3. The method of claim 1 including self-phase modulating the optical pulse.

4. The method of claim 1 including thermo-optically phase-shifting said wavelengths.

5. The method of claim 1 including electro-optically phase-shifting said wavelengths.

6. The method of claim 1 including piezo-optically phase-shifting said wavelengths.

7. The method of claim 1 including multiplexing said wavelengths.

8. The method of claim 7 including using an arrayed waveguide grating to multiplex said wavelengths.

9. The method of claim 1 including compressing the optical pulse in a planar lightwave circuit.

\* \* \* \* \*